(12) United States Patent
Ryu

(10) Patent No.: US 11,349,138 B2
(45) Date of Patent: May 31, 2022

(54) COLD START CONTROL SYSTEM AND CONTROL METHOD FOR FUEL CELL

(71) Applicants: Hyundai Motor Company, Seoul (KR); Kia Motors Corporation, Seoul (KR)

(72) Inventor: Jung Hwan Ryu, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 513 days.

(21) Appl. No.: 16/385,857

(22) Filed: Apr. 16, 2019

(65) Prior Publication Data

US 2020/0153007 A1 May 14, 2020

(30) Foreign Application Priority Data

Nov. 13, 2018 (KR) .................. 10-2018-0138772

(51) Int. Cl.
| | |
|---|---|
| *H01M 8/04223* | (2016.01) |
| *H01M 8/04029* | (2016.01) |
| *H01M 8/04701* | (2016.01) |
| *H01M 8/04007* | (2016.01) |
| *H01M 8/04992* | (2016.01) |
| *H01M 8/04302* | (2016.01) |
| *H01M 8/04225* | (2016.01) |

(52) U.S. Cl.
CPC ... *H01M 8/04253* (2013.01); *H01M 8/04029* (2013.01); *H01M 8/04037* (2013.01); *H01M 8/04225* (2016.02); *H01M 8/04302* (2016.02); *H01M 8/04701* (2013.01); *H01M 8/04992* (2013.01)

(58) Field of Classification Search
None
See application file for complete search history.

(56) References Cited

U.S. PATENT DOCUMENTS

| | | | |
|---|---|---|---|
| 2011/0014534 A1* | 1/2011 | Sung ................ | H01M 8/04231 429/429 |
| 2017/0187053 A1* | 6/2017 | Hoshi ............... | H01M 8/04291 |
| 2020/0036021 A1* | 1/2020 | Takahashi ......... | H01M 8/04253 |

FOREIGN PATENT DOCUMENTS

| | | |
|---|---|---|
| KR | 10-1601222 B1 | 3/2016 |
| KR | 101610392 B1 | 4/2016 |
| KR | 10-2018-0046622 A | 5/2018 |

\* cited by examiner

*Primary Examiner* — Christopher P Domone
(74) *Attorney, Agent, or Firm* — Fox Rothschild LLP

(57) ABSTRACT

A cold start control method for a fuel cell is provided. The method includes determining whether a cold start condition upon start on is satisfied and estimating thawing energy required to thaw frozen moisture inside a fuel cell stack when the cold start condition has been satisfied. A thawing control SOC of a high-voltage battery is calculated based on the estimated thawing energy. The cooling water inside a cooling water line for cooling the fuel cell stack is heated by using a heater having received power from the high-voltage battery when the current SOC of the high-voltage battery is equal to or less than a thawing control SOC.

11 Claims, 3 Drawing Sheets

COLD START CONTROL SYSTEM AND CONTROL METHOD FOR FUEL CELL

CROSS REFERENCE TO RELATED APPLICATION

The present application claims priority of Korean Patent Application No. 10-2018-0138772 filed on Nov. 13, 2018, the entire contents of which is incorporated herein for all purposes by this reference.

BACKGROUND

Field of the Disclosure

The present disclosure relates to a cold start control system and control method for a fuel cell, and more particularly, to a technology for thawing the iced moisture present in a fuel cell stack by heating cooling water of a fuel cell using a cooling water heater.

Description of the Related Art

A fuel cell converts chemical energy into electrical energy by using the oxidation-reduction reaction of hydrogen and oxygen supplied from a hydrogen supply device and an air supply device, respectively. The fuel cell includes a fuel cell stack for producing electrical energy, a cooling system for cooling the fuel cell, and the like. In particular, hydrogen is supplied to the anode side of the fuel cell stack, and the oxidation reaction of hydrogen is performed at the anode to generate hydrogen ions (proton) and electrons, and the hydrogen ions and electrons generated at this time move to the cathode through an electrolyte membrane and a separator, respectively. In the cathode, water is generated through an electrochemical reaction in which hydrogen ions and electrons moved from the anode and oxygen in the air participate, and electric energy is generated from the flow of electrons.

However, the moisture generated by the reaction is present inside the fuel cell stack, and accordingly, exposed to the below zero temperature in a state where the power generation of the fuel cell stack has been stopped, the moisture inside the fuel cell stack freezes. Accordingly, strategies related to a cold start control of the fuel cell stack have been developed. A cold start control according to the related art was developed to maximize the heat generation amount through a low efficiency operation in the fuel cell stack, thereby thawing the iced moisture inside the fuel cell stack. However, according to the cold start control in the related art, fuel efficiency is reduced by unnecessarily consuming hydrogen according to the low efficiency operation for maximizing the heat generation amount, and when it is operated in a state where the iced moisture is present therein, there was a fatal problem in durability of the fuel cell stack.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a technology for thawing the iced moisture that is present inside a fuel cell stack by heating cooling water of a fuel cell by operating a heater using power of a high-voltage battery.

A cold start control system for a fuel cell according to the present disclosure for achieving the object may include a fuel cell stack; a cooling water line for cooling the fuel cell stack while cooling water is circulated therein; a heater disposed on the cooling water line, and for heating the cooling water by receiving the power of a high-voltage battery; and a controller configured to determine whether a cold start condition upon start on is satisfied, to estimate thawing energy required to thaw the iced moisture inside the fuel cell stack, to calculate a thawing control state of charge (SOC) of the high-voltage battery based on the estimated thawing energy, and to heat the cooling water using the heater when the current SOC of the high-voltage battery is equal to or less than a thawing control SOC.

The cold start control system for the fuel cell may further include a cooling water pump disposed on the cooling water line and configured to provide power for circulating the cooling water, and the controller may be configured to determine whether the cold start condition is satisfied based on the temperature of the cooling water when the cooling water pump has been driven. The cold start control system for the fuel cell may further include a cooling water pump disposed on the cooling water line and configured to provide power for circulating the cooling water, and the controller may be configured to estimate the thawing energy based on the temperature change amount of the cooling water as the cooling water is heated by the heater when the cooling water pump has been driven.

The cold start control system for the fuel cell may further include a heat-dissipating unit branched from the cooling line between the heater and the fuel cell to be connected in parallel with the heater to bypass and join the heater; and a control valve disposed at a branched point or a joined point between the heater and the heat-dissipating unit of the cooling water line. The control valve may be configured to adjust a flow rate of the cooling water flowing through the heater or the heat-dissipating unit, and the controller may be configured to operate the control valve to prevent the cooling water from flowing through the heat-dissipating unit until the cooling water heating of the heater is terminated.

A cold start control method for a fuel cell according to the present disclosure for achieving the object may include determining whether a cold start condition upon start on is satisfied; estimating thawing energy required to thaw the iced moisture inside a fuel cell stack when the cold start condition has been satisfied; calculating a thawing control state of charge (SOC) of a high-voltage battery based on the estimated thawing energy; and heating cooling water inside a cooling water line for cooling the fuel cell stack using a heater having received power from the high-voltage battery when the current SOC of the high-voltage battery is equal to or less than a thawing control SOC.

The determining of whether the cold start condition is satisfied may include determining whether the cold start condition is satisfied based on the temperature of the cooling water when a cooling water pump for circulating the cooling water inside the cooling water line has been driven. The estimating of the thawing energy may include estimating the thawing energy based on the temperature change amount of the cooling water as the cooling water is heated by the heater by receiving power from the high-voltage battery when a cooling water pump for circulating the cooling water inside the cooling water line has been driven.

Additionally, the estimating of the thawing energy may include estimating the thawing energy by multiplying the consumed power amount of the heater with respect to the temperature change amount of the cooling water according to the heating of the heater by the temperature difference between the current temperature of the cooling water and a thawing completed temperature. The calculating of the thawing control SOC of the high-voltage battery may include calculating the thawing control SOC of the high-voltage battery by summing a reference SOC of the high-voltage battery in which the power generation of the fuel cell is required and the SOC change amount of the high-voltage battery according to the estimated thawing energy.

In the heating of the cooling water, the heater may be configured to heat the cooling water until the estimated thawing energy is consumed. Additionally, the heating of the cooling water may include blocking the power generation of the fuel cell until the cooling water heating of the heater is terminated. The cold start control method for the fuel cell may further include determining whether thawing has been completed by comparing the current temperature of the cooling water and a thawing completed temperature after the heating the cooling water.

According to the cold start control system and control method for the fuel cell of the present disclosure, it may be possible to generate power of the fuel cell after thawing the iced moisture inside the fuel cell stack, thereby preventing fuel efficiency from being reduced due to the low efficiency operation. In addition, it may be possible to prevent deterioration in durability due to the low efficiency operation, thereby enhancing the durability of the fuel cell stack. Further, it may be possible to minimize an unnecessary thawing operation by performing a thawing operation when the SOC of the high-voltage battery is equal to or less than the thawing control SOC.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
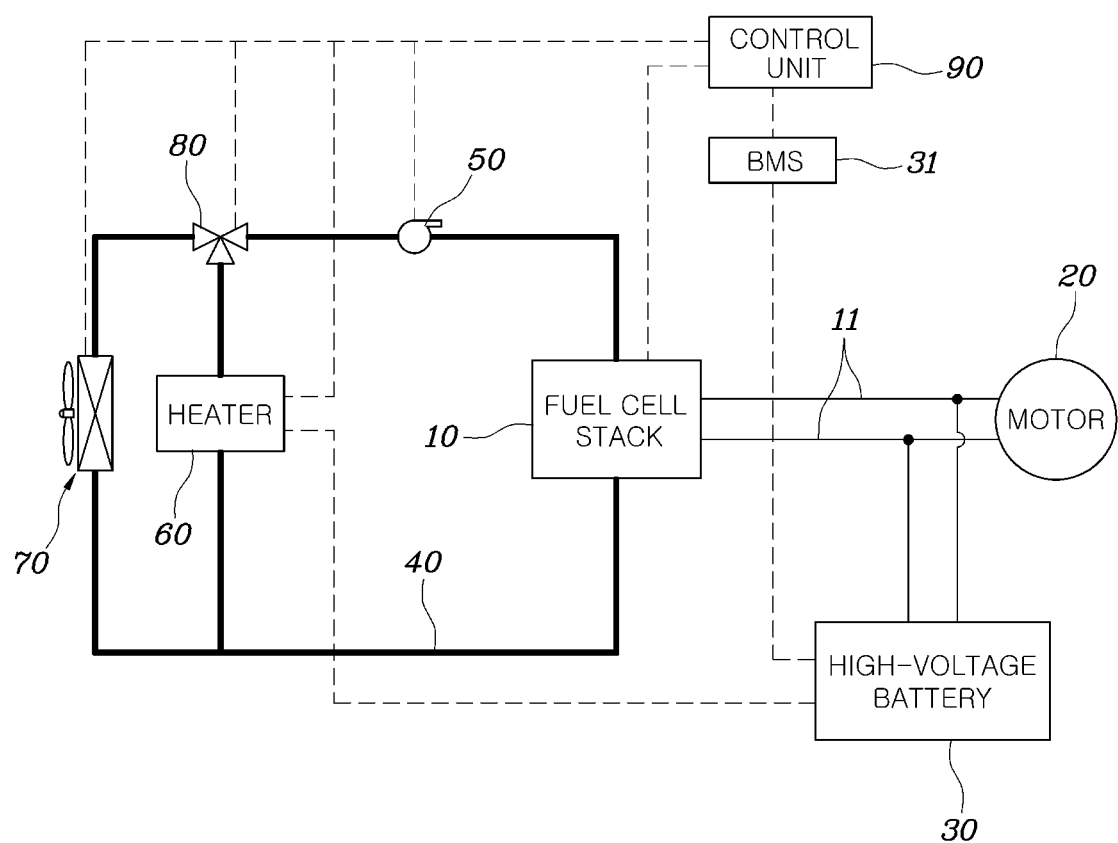
FIG. 1 is a block diagram of a cold start control system of a fuel cell according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions of the exemplary embodiments of the present disclosure disclosed in the specification or application are only for the purpose of illustrating the embodiments of the present disclosure, and the exemplary embodiments in accordance with the present disclosure may be embodied in various forms and should not be construed as limited to the exemplary embodiments set forth in the specification or application. Various modifications and various forms may be made in the exemplary embodiments according to the present disclosure, so that specific exemplary embodiments are illustrated in the drawings and described in detail in the specification or application. It should be understood, however, that it is not intended to limit the exemplary embodiments in accordance with the concepts of the present disclosure to the particular disclosed forms, but includes all modifications, equivalents, and alternatives falling within the sprit and technical scope of the present disclosure.

The terms "first" and/or "second," and the like may be used to illustrate various components, but the components should not be limited by the terms. The terms are used to differentiate one element from another, for example, a first component may be referred to as a second component, and similarly, the second component may be also referred to as the first component without departing from claims in accordance with the concepts of the present disclosure. It will be understood that when an element is referred to as being "connected" or "coupled" to another element, it may be "directly connected" or "coupled" to the other element, but also to the other element with other elements interposed therebetween. On the other hand, it should be understood that any configuration element has no other element in between the time stated that "directly connected" or "directly coupled" to another element. Other expressions that describe the relationship between elements, such as "between" and "directly between" or "adjacent to" and "directly adjacent to" should be interpreted as well.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the specification.

Hereinafter, exemplary embodiments of the present disclosure will be described in detail with reference to the accompanying drawings. The same reference numerals denoted in each drawing represent the same members.

FIG. 1 is a block diagram of a cold start control system for a fuel cell according to an exemplary embodiment of the present disclosure. Referring to FIG. 1, a cold start control system for a fuel cell according to an exemplary embodiment of the present disclosure may include a fuel cell stack 10; a cooling water line 40 for cooling the fuel cell stack 10 while cooling water is circulated therein; a heater 60 disposed on the cooling water line 40 and configured to heat the cooling water by receiving the power of the high-voltage battery 30; and a controller 90 configured to determine whether a cold start condition upon start-on is satisfied, estimate thawing energy required to thaw the iced moisture inside the fuel cell stack 10, calculate a thawing control state of charge (SOC) of the high-voltage battery 30 based on the estimated thawing energy, and heat the cooling water using the heater 60 when the current SOC of the high-voltage battery 30 is equal to or less than the thawing control SOC.

The fuel cell stack 10 receives hydrogen and air, and may be configured to generate electrical energy through chemical reaction therein. Water is generated in the fuel cell stack 10 by the chemical reaction between hydrogen and oxygen, and when exposed to the below zero temperature in a state where the power generation of the fuel cell stack 10 is stopped, the moisture remained inside the fuel cell stack 10 will freeze. The fuel cell stack 10 may be configured to supply power to a motor 20 through a main bus terminal to which a high-voltage battery 30 may be connected. The high-voltage battery 30 may be configured to supply the charged energy to the motor 20. The high-voltage battery 30 may be charged using the generated power of the fuel cell, or may be charged using an external charge device.

Further, the controller 90 may be part of a fuel cell vehicle control unit (FCU), such as an electronic control unit (ECU), or may be a lower controller of the fuel cell vehicle control unit (FCU). The high-voltage battery 30 may be connected to the main bus terminal via a bidirectional high-voltage direct current (DC) Converter (BHDC) or a DC converter. In addition, the charge amount of the high-voltage battery 30 may be monitored by a battery management system (BMS) 31, and as will be described later, the controller 90 connected to the BMS 31 may be configured to maintain the charge amount of the high-voltage battery 30.

The fuel cell stack 10 may be connected to the cooling water line 40 and thus, the cooling water inside the cooling water line 40 may be cooled while being circulated therein. The cooling water may be various refrigerants such as water and air. Since heat is generated inside the fuel cell stack 10 by the chemical reaction, the cooling water may be circulated through the cooling water line 40 to cool the fuel cell stack 10. The cooling water line 40 may include the heater 60 configured to heat the cooling water. The heater 60 may be configured to receive the power of the high-voltage battery 30 to heat the cooling water in the cooling water line 40. In particular, the fuel cell stack 10 is required to heat the temperature of the cooling water since it has high efficiency at an appropriate temperature range, it is operated at low efficiency when generating power of the fuel cell under a cold start condition, and durability thereof is deteriorated.

The cold start control system for the fuel cell may further include a cooling water pump 50 disposed on the cooling water line 40 and configured to provide power for circulating the cooling water. The cooling water pump 50 may be configured to pump the cooling water to circulate the cooling water inside the cooling water line 40 within the fuel cell stack 10. The cold start control system for the fuel cell may further include a heat-dissipating unit 70 branched from the cooling water line 40 between the heater 60 and the fuel cell and connected in parallel with the heater 60 to bypass and join the heater 60; and a control valve 80 disposed at a branched point or a joined point between the heater 60 and the heat-dissipating unit 70 in the cooling water line 40 and configured to adjust the flow rate of cooling water flowing through the heater 60 or the heat-dissipating unit 70.

Particularly, the heat-dissipating unit 70 may be connected in parallel with the heater 60 and thus, the cooling water discharged from the fuel cell stack 10 may be supplied to any one of the heater 60 and the heat-dissipating unit 70. The heat-dissipating unit 70 may be configured to cool the cooling water, and the heater 60 may be configured to heat the cooling water, and thus, the heat-dissipating unit 70 and the heater 60 may be connected to each other in parallel in terms of operating in opposition to each other. The heat-dissipating unit 70 may be a radiator configured to exchange heat with outside air or the like, and may further include a heat-dissipating fan configured to supply outside air to the radiator from the outside of the radiator.

The control valve 80 may be a 3-way valve disposed at a branched point or a joined point between the heater 60 and the heat-dissipating unit 70 of the cooling water line 40, and may be configured to supply the cooling water of the cooling water line 40 to the heater 60 or to supply the cooling water to the heat-dissipating unit 70. The controller 90 may be configured to operate the control valve 80 to prevent the cooling water from flowing to the heat-dissipating unit 70 until the cooling water heating of the heater 60 is finished. In other words, the controller 80 may be configured to operate the control valve 80 to stop the cooling water from being supplied to the heat-dissipating unit 70 and instead be supplied only to the heater 60. A specific operation of the controller 90 will be described later in connection with the control method.

Figure 2:
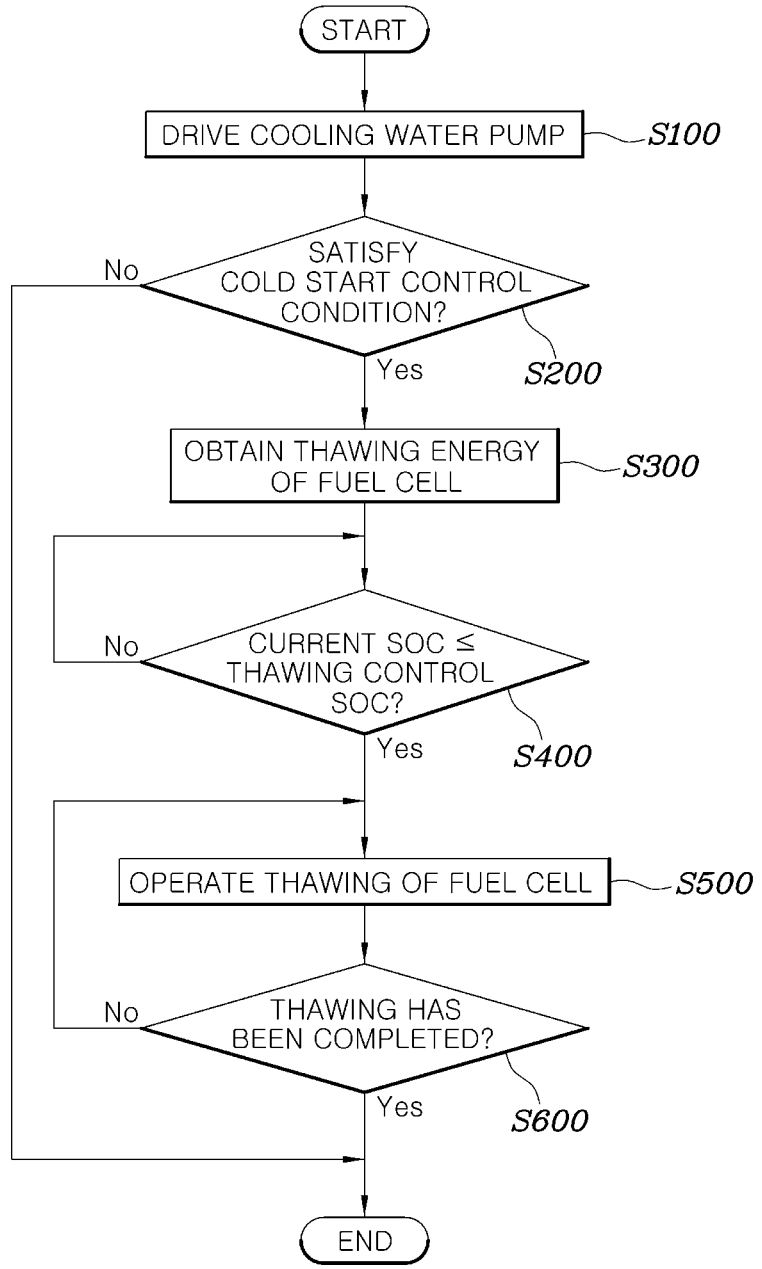
FIG. 2 is a flowchart of a cold start control method of the fuel cell according to an exemplary embodiment of the present disclosure.

FIG. 2 is a flowchart of a cold start control method for the fuel cell according to an exemplary embodiment of the present disclosure. The method described herein below may be executed by the controller 90. Further referring to FIG. 2, a cold start control method for the fuel cell according to an exemplary embodiment of the present disclosure may include determining whether a cold start condition upon start-on is satisfied S200; estimating thawing energy required to thaw the iced (e.g., frozen) moisture inside the fuel cell stack 10 when the cold start condition is satisfied S300; calculating a thawing control state of charge (SOC) of the high-voltage battery 30 based on the estimated thawing energy S400; and heating the cooling water inside the cooling water line 40 for cooling the fuel cell stack 10 using the heater 60 configured to receive power from the high-voltage battery 30 when the current SOC of the high-voltage battery 30 is equal to or less than the thawing control SOC S500.

Accordingly, the fuel cell may be power-generated after the cooling water is heated by the heater 60 using the power of the high-voltage battery 30. In particular, since the motor 20 should be driven only by the power of the high-voltage battery 30 until before the fuel cell is power-generated, the high-voltage battery 30 of the present disclosure may be a plug-in hybrid electronic vehicle (PHEV) type that is chargeable using an external charge device. The state of charge (SOC) of the high-voltage battery 30 is a charge amount of the high-voltage battery 30, and may be a value that indicates a ratio of the charge amount between 0 and 1. In other words, the SOC has a value of 1 when fully charged and has a value of 0 when fully discharged.

The determining of whether the cold start condition is satisfied S200 may include determining the cold start condition when the start of a fuel cell vehicle or a fuel cell system is generated as an ON signal. The cold start condition may be determined using the temperature of the fuel cell stack 10. However, rather than directly measuring the internal temperature of the fuel cell stack 10, the temperature of the fuel cell stack 10 may be indirectly measured by measuring the temperature of the cooling water at the outlet of the fuel cell stack 10 discharged from the fuel cell stack 10. A temperature sensor may be disposed on the cooling water line 40 at the outlet side of the fuel cell stack 10.

In particular, it may be possible to determine whether the cold start condition is satisfied based on the temperature of the cooling water in a state of driving the cooling water pump 50 configured to circulate the cooling water inside the cooling water line 40 S100. Additionally, it may be possible to determine whether the moisture has been frozen inside the fuel cell stack 10 by using the temperature of the cooling water in a state of circulating the cooling water to the fuel cell stack 10 by the cooling water pump 50. For example, when the cooling water temperature at the outlet side of the fuel cell stack 10 is about 0° C. or less, the cold start condition may be determined to be satisfied. As a result, it may be possible to determine whether the frozen moisture of the fuel cell stack 10 is present, thereby more accurately determining the cold start condition. For a more accurate determination, it may be possible to determine the cold start condition after a particular amount of time (e.g., 5 seconds) has lapsed after the cooling water pump 50 is driven.

Additionally, estimating of the thawing energy S300 may include estimating the thawing energy based on the temperature change amount of the cooling water as the cooling water is heated by the heater 60 by receiving the power of the high-voltage battery 30 in a state of driving the cooling water pump 50 configured to circulate the cooling water inside the cooling water line 40. The cooling water may be heated by operating the heater 60 for a predetermined period of time or by supplying a predetermined amount of power to the heater 60. In addition, the temperature change amount of the cooling water may be measured in a state of driving the cooling water pump 50. In particular, the temperature change amount of the cooling water may be measured at the outlet side of the fuel cell stack 10. The thawing energy may be estimated by multiplying the consumed power amount (P×t) of the heater 60 with respect to the temperature change amount $\Delta T_c$ of the cooling water according to the heating of the heater 60 by the temperature difference between the current temperature T of the cooling water and the thawing completed temperature $T_t$. In other words, the thawing energy may be estimated by using the following equation.

$$E = \frac{P \times t}{\Delta T_c} \times (T_t - T)$$

wherein, E refers to the thawing energy, P to the consumed power of the heater 60, t to the heating time of the heater 60, $\Delta T_c$ to the thawing completed temperature, and T to the current cooling water temperature (after the cooling water heating of the heater 60).

Figure 3:
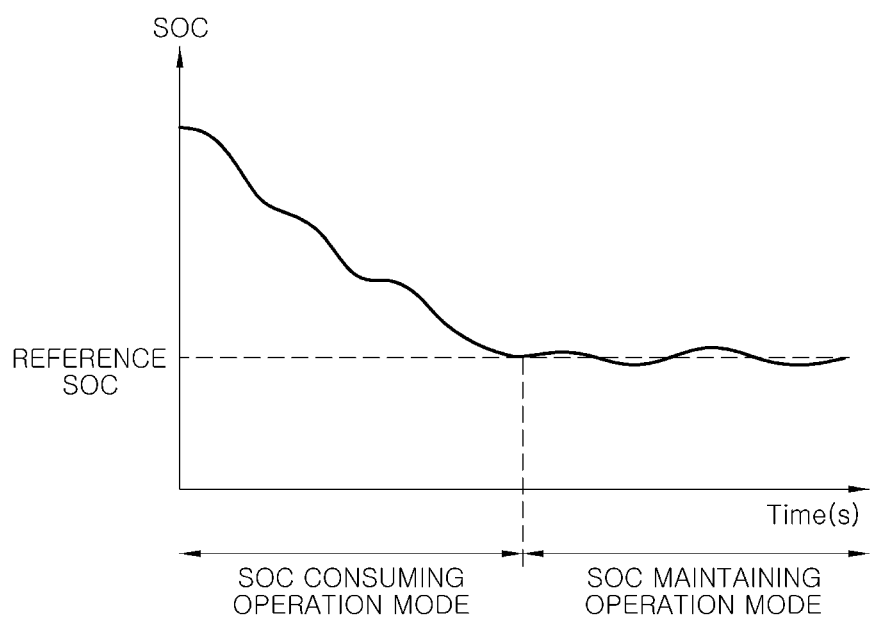
FIG. 3 is a graph illustrating the SOC of a high-voltage battery according to an operation mode of a fuel cell system according to an exemplary embodiment of the present disclosure.

FIG. 3 is a graph illustrating the SOC of the high-voltage battery 30 according to the operation mode of the fuel cell system according to an exemplary embodiment of the present disclosure. Further referring to FIG. 3, the operation mode of the fuel cell system may include an SOC consuming operation mode and an SOC maintaining operation mode. The SOC consuming operation mode includes consuming the SOC to supply power to the motor 20, or the like while the high-voltage battery 30 is discharged, and the fuel cell may not generate power. The SOC maintaining operation mode includes maintaining the SOC of the high-voltage battery 30, and in which the charge and discharge of the high-voltage battery 30 are repeated.

When the SOC maintaining operation mode is entered, the high-voltage battery 30 may be charged using the power generated by the fuel cell. In the SOC maintaining operation mode, both the high-voltage battery 30 and the fuel cell may supply power to the motor 20, or the like. The controller 90 may be configured to operate the fuel cell system while monitoring the SOC of the high-voltage battery 30 in the BMS 31. In particular, when the SOC of the high-voltage battery 30 reaches a reference SOC, the controller 90 may be configured to operate the fuel cell system in the SOC maintaining operation mode. In other words, when the SOC of the high-voltage battery 30 reaches the reference SOC, the controller 90 may be configured to generate power in the fuel cell by operating the fuel cell.

The reference SOC is a charge amount that has been charged to such an extent of supporting the generated power of the fuel cell while the high-voltage battery 30 performs partial charge or discharge, and may be a predetermined value in the controller 90 based on the capacity of the high-voltage battery 30. Again referring to FIG. 2, the calculating of the thawing control SOC of the high-voltage battery 30 S400 may include calculating the thawing control SOC of the high-voltage battery 30 by summing the SOC change amount of the high-voltage battery 30 according to the estimated thawing energy and the reference SOC of the high-voltage battery 30 in which the power generation of the fuel cell is required. For example, the reference SOC of the high-voltage battery 30 may be 20% or 30% of the maximum charging amount of the high-voltage battery 30.

The thawing control SOC of the high-voltage battery 30 may be calculated by summing the SOC change amount of the high-voltage battery 30 according to the estimated thawing energy and the reference SOC of the high-voltage battery 30 as in the following equation. As a result, it may be possible to complete the thawing of the fuel cell stack 10 before operating the fuel cell.

Thawing control SOC=reference SOC+ΔSOC

Specifically, the SOC change amount (ΔSOC) of the high-voltage battery 30 according to the estimated thawing energy E may be calculated by the following equation.

$$\Delta SOC = \frac{\Delta Q}{Q} = \frac{E}{V_{bat} \times Q}$$

wherein, ΔSOC refers to the SOC change amount of the high-voltage battery 30, Q to the capacity of the battery, E to the thawing energy, and $V_{bat}$ to the voltage of the high-voltage battery 30. The voltage $V_{bat}$ of the high-voltage battery 30 varies minimally in the duration where the SOC change of the high-voltage battery 30 is minimal, and thus, the voltage may be calculated as a fixed value. The capacity of the battery may be a current amount [C].

The heating of the cooling water S500 may include heating the cooling water using the heater 60 when the current SOC of the high-voltage battery 30 is equal to or less than the thawing control SOC. In other words, the thawing operation may not be performed when the operation of the fuel cell is unnecessary in a state where the SOC of the high-voltage battery 30 is sufficiently high. As a result, it may be possible to prevent an unnecessary thawing operation, thereby minimizing power consumption.

In the heating of the cooling water S500, the heater 60 may be configured to heat the cooling water until the estimated thawing energy is consumed. In other words, the heater 60 may be configured to heat the cooling water until the estimated thawing energy is all consumed, and the thawing operation may be stopped when the thawing energy is all consumed. In particular, the heating of the cooling water S500 may be configured to block the power generation of the fuel cell until the cooling water heating of the heater 60 is terminated. The fuel cell starts power generation after the cooling water heating of the heater 60 is terminated, and the fuel cell may be operated not to generate power until the thawing operation of the fuel cell is completed. As a result, it may be possible to prevent a low efficiency operation of the fuel cell, and to secure the durability of the fuel cell stack 10.

The heating of the cooling water may include operating the heater 60 until the estimated thawing energy is all consumed, and the thawing of the fuel cell stack 10 may be determined to be completed when the heater 60 consumes the estimated thawing energy. In addition, after the heating the cooling water S500, the cold water control method for the fuel cell may further include determining whether the thawing has been completed by comparing the current temperature of the cooling water and the thawing completed temperature S600. The determining of whether the thawing has been completed S600 may include reconfirming whether the thawing has been completed by comparing the current temperature of the cooling water with the thawing completed temperature in a state where the heating of the heater 60 has been terminated. Accordingly, whether the thawing has been completed may be reconfirmed based on the possibility that the thawing of the fuel cell stack 10 was not completed due to an external environmental factor or the like.

The thawing completed temperature may be predetermined as a positive temperature according to the system characteristics such as the cooling water line 40 and the like. The thawing of the fuel cell stack 10 may be determined to be completed when the cooling water temperature at the outlet side of the fuel cell is equal to or greater than the thawing completed temperature, thereby terminating the cold start control. After the cold start control has been terminated, the controller 90 may be configured to start the power generation of the fuel cell stack 10.

While it has been illustrated and described with respect to the specific exemplary embodiments of the present disclosure, it will be understood by those skilled in the art that various improvement and changes of the present disclosure may be made within the limitation not departing from the technical spirit of the present disclosure as provided by the following claims.

What is claimed is:

1. A cold start control system for a fuel cell, comprising:
a fuel cell stack;
a cooling water line for cooling the fuel cell stack while cooling water is circulated therein;
a heater disposed on the cooling water line and configured to heat the cooling water by receiving the power of a battery; and
a controller configured to determine whether a cold start condition upon start on is satisfied, estimate thawing energy required to thaw frozen moisture inside the fuel cell stack, calculate a thawing control state of charge (SOC) of the battery based on the estimated thawing energy, and heat the cooling water using the heater when the current SOC of the battery is equal to or less than a thawing control SOC.

2. The cold start control system for the fuel cell according to claim 1, further comprising:
a cooling water pump disposed on the cooling water line and configured to provide power for circulating the cooling water,
wherein the controller is configured to determine whether the cold start condition is satisfied based on the temperature of the cooling water when the cooling water pump has been driven.

3. The cold start control system for the fuel cell according to claim 1, further comprising:
a cooling water pump disposed on the cooling water line and configured to provide power for circulating the cooling water,
wherein the controller is configured to estimate the thawing energy based on the temperature change amount of the cooling water as the cooling water is heated by the heater when the cooling water pump has been driven.

4. The cold start control system for the fuel cell according to claim 1, further comprising:
a heat-dissipating unit branched from the cooling water line between the heater and the fuel cell to be connected in parallel with the heater to bypass and join the heater; and
a control valve disposed at a branched point or a joined point between the heater and the heat-dissipating unit of the cooling water line and configured to adjust a flow rate of the cooling water flowing through the heater or the heat-dissipating unit,
wherein the controller is configured to operate the control valve to prevent the cooling water from flowing through the heat-dissipating unit until the cooling water heating of the heater is terminated.

5. A cold start control method for a fuel cell, comprising:
determining, by a controller, whether a cold start condition upon start on is satisfied based on a temperature of cooling water when a cooling water pump configured to circulate the cooling water inside a cooling water line has been driven;

estimating, by the controller, thawing energy required to thaw frozen moisture inside a fuel cell stack when the cold start condition has been satisfied;

calculating, by the controller, a thawing control state of charge (SOC) of a battery based on the estimated thawing energy; and heating, by the controller, the cooling water inside the cooling water line for cooling the fuel cell stack using a heater having received power from the battery when the current SOC of the battery is equal to or less than a thawing control SOC.

6. The cold start control method for the fuel cell according to claim 5, wherein the estimating of the thawing energy includes:

estimating, by the controller, the thawing energy based on the temperature change amount of the cooling water as the cooling water is heated by the heater by receiving power from the battery when a cooling water pump configured to circulate the cooling water inside the cooling water line has been driven.

7. The cold start control method for the fuel cell according to claim 6, wherein the estimating of the thawing energy includes:

estimating, by the controller, the thawing energy by multiplying the consumed power amount of the heater with respect to the temperature change amount of the cooling water according to the heating of the heater by the temperature difference between the current temperature of the cooling water and a thawing completed temperature.

8. The cold start control method for the fuel cell according to claim 5, wherein the calculating of the thawing control SOC of the battery includes:

calculating, by the controller, the thawing control SOC of the battery by summing a reference SOC of the battery in which the power generation of the fuel cell is required and the SOC change amount of the battery based on the estimated thawing energy.

9. The cold start control method for the fuel cell according to claim 5, wherein in the heating of the cooling water, the heater is configured to heat the cooling water until the estimated thawing energy is consumed.

10. The cold start control method for the fuel cell according to claim 9, wherein the heating the cooling water includes blocking the power generation of the fuel cell until the cooling water heating of the heater is terminated.

11. The cold start control method for the fuel cell according to claim 5, further comprising:

determining, by the controller, whether thawing has been completed by comparing the current temperature of the cooling water and a thawing completed temperature after the heating the cooling water.

* * * * *